United States Patent [19]
Shiokawa et al.

[11] Patent Number: 5,716,916
[45] Date of Patent: Feb. 10, 1998

[54] POLYOL ESTER BASED-LUBRICANT

[75] Inventors: Yoshihiro Shiokawa; Yoshifumi Sato; Kinji Kato, all of Okayama-ken, Japan

[73] Assignee: Mitsubishi Gas Chemical Company, Inc., Okayama-ken, Japan

[21] Appl. No.: 835,881

[22] Filed: Apr. 8, 1997

[30] Foreign Application Priority Data

Apr. 9, 1996 [JP] Japan ................. 8-086596

[51] Int. Cl.$^6$ ................................. C10M 105/38
[52] U.S. Cl. .................... 508/485; 508/492; 252/68
[58] Field of Search ........................ 508/485, 492; 252/68

[56] References Cited

U.S. PATENT DOCUMENTS

| | | | |
|---|---|---|---|
| 3,441,600 | 4/1969 | Chao et al. | 508/485 |
| 3,562,300 | 2/1971 | Chao et al. | 508/485 |
| 4,053,491 | 10/1977 | Koch et al. | 508/485 |
| 4,144,183 | 3/1979 | Koch et al. | 508/485 |
| 5,057,247 | 10/1991 | Schmid et al. | 508/492 |
| 5,096,606 | 3/1992 | Hagihara et al. | 252/68 |
| 5,202,044 | 4/1993 | Hagihara et al. | 252/68 |
| 5,395,544 | 3/1995 | Hagihara et al. | 252/68 |
| 5,463,095 | 10/1995 | Shiokawa et al. | 554/130 |
| 5,468,406 | 11/1995 | Schmid et al. | 508/485 |
| 5,470,497 | 11/1995 | Schlosberg et al. | 508/485 |
| 5,486,302 | 1/1996 | Short | 252/56 S |
| 5,494,597 | 2/1996 | Krevallis et al. | 252/68 |

FOREIGN PATENT DOCUMENTS

| | | |
|---|---|---|
| 440069 | 1/1991 | European Pat. Off. |
| 730020 | 9/1996 | European Pat. Off. |
| 314793 | 11/1992 | Japan |
| 1291 | 1/1993 | Japan |
| 17789 | 1/1993 | Japan |
| 25484 | 2/1993 | Japan |
| 70789 | 3/1993 | Japan |
| 271676 | 10/1993 | Japan |
| WO12849 | 11/1990 | WIPO |

*Primary Examiner*—Jacqueline V. Howard
*Attorney, Agent, or Firm*—Roylance,Abrams,Berdo & Goodman, L.L.P.

[57] ABSTRACT

A polyol ester-based lubricant comprising a polyol ester (A) and a polyol ester (B);

the polyol ester (A) comprising an ester of a neopentyl polyol and an acid residue of carbon number of 6-17, in which alpha-carbon in the acid residue of the polyol ester is tertiarily branched, and when alkyl groups having 4 or more carbon atoms are bonded to the alpha-carbon, the alkyl groups are branched, and the polyol ester (B) comprising an ester of a neopentyl polyol and an acid residue of carbon number of 6-17, in which alpha-carbon in the acid residue of the polyol ester is secondarily or tertiarily branched and alkyl groups bonded to the alpha-carbon are straight is provided. This polyol ester-based lubricant has high performance, as demonstrated by high compatibility with substitute fluorocarbons in a kinematic viscosity range of 28 to 40 cst at 40° C., excellent hydrolysis resistance, and a low pour point.

12 Claims, No Drawings

POLYOL ESTER BASED-LUBRICANT

BACKGROUND OF THE INVENTION

The present invention relates to a polyol ester for use as a lubricant such as refrigerator oil. More particularly, it relates to a polyol ester having excellent compatibility with substitute fluorocarbons, excellent hydrolysis resistance, and a low pour point.

Chlorine-containing chlorofluorocarbons and hydrochlorofluorocarbons have been widely used as refrigerant fluorocarbons for refrigerators. In recent years, however, it has been found that chlorine contained in these fluorocarbons destroys the ozone layer of the stratosphere, and the restriction on the use of chlorofluorocarbons and hydrochlorofluorocarbons has been becoming globally tightened up. Chlorine-free hydrofluorocarbons, therefore, begin to find use as novel refrigerants.

On the other hand, mineral oil-containing or alkylbenzene-containing refrigerator oils which have been used so far are difficult to use with the novel refrigerants because of their poor compatibility with these refrigerants. Thus, study is under way for the use of polyol ester-based refrigerator oils, excellently compatible with the novel refrigerants, as substitute refrigerator oils.

Polyol esters have hitherto been produced by esterifying fatty acids and polyhydric alcohols under heat, as described in Japanese Laid-Open Patent Publication Nos. 25484/93 and 70789/93. This reaction is known to proceed slowly even at an elevated temperature of 200° C. or higher. The use of a reactor having a large capacity is therefore required for commercial-scale production.

To avoid the reaction requiring a high temperature and a long reaction time, Japanese Laid-Open Patent Publication Nos. 314793/92, 271676/93 and 1291/93 disclose a method in which a polyol ester is produced through an acid chloride.

This method carried out through an acid chloride, however, requires the preparation of an acid chloride from a fatty acid, and thus the use of an acid chloride such as phosphorus trichloride, phosphorus pentachloride or thionyl chloride. These acid chlorides are tiresome to handle, making a production process complicated.

When polyol esters are to be used as refrigerator oils for substitute fluorocarbons, refrigerators with a reciprocating compressor mainly use polyol esters of the viscosity grade VG15 having a kinematic viscosity at 40° C. of 13.5 to 16.5 cst, while refrigerators with a rotary compressor use polyol esters graded VG32. Air conditioners employ polyol esters of the grade VG32, VG56 or VG68.

Of polyol esters of these viscosity grades, polyol esters of the grade VG15 usable as refrigerator oils can be produced by mixing a polyol ester which is obtained from 2-ethylhexanoic acid and neopentyl glycol, with a polyol ester which is obtained from 2-ethylhexanoic acid and pentaerythritol.

Polyol esters of the viscosity grade VG32 having a kinematic viscosity at 40° C. of 28.8 to 35.2 cst, which are used for refrigerators and air conditioners, are described, for example, in Japanese Laid-Open Patent Publication No. 209171/93, which disclose an ester mixture of a polyol ester obtained from 3,5,5-trimethylhexanoic acid and neopentyl glycol and a polyol ester obtained from 3,5,5-trimethylhexanoic acid and trimethylolpropane (mixing weight ratio 35/65), a polyol ester obtained from a 2-methylhexanoic acid/2-ethylhexanoic acid mixture (weight ratio 60/40) and pentaerythritol, a polyol ester obtained from a 2-methylhexanoic acid/3,5-dimethylhexanoic acid mixture (weight ratio 80/20) and pentaerythritol, and a polyol ester obtained from 3,5-dimethylhexanoic acid and trimethylolpropane.

These polyol esters have satisfactory pour points of −40° C. or lower, but many of them are defective in that mixtures of 1,1,1,2-tetrafluoroethane (R-134a), one of the candidates for substitute fluorocarbons, with these polyol esters (weight ratio 9/1) cause phase separation on the low-temperature side at higher temperature. Furthermore, not all of these esters are satisfactory in hydrolysis resistance. Thus, it is difficult to use them as refrigerator oils for refrigerators with a rotary compression or air conditioners.

As stated above, a polyol ester of the viscosity grade VG15 is produced by mixing a polyol ester obtained from 2-ethylhexanoic acid and neopentyl glycol, with a polyol ester obtained from 2-ethylhexanoic acid and pentaerythritol. By varying their mixing ratio, a polyol ester of the viscosity grade VG32 can be obtained. Since the changed mixing ratio results in too high a pour point, however, the resulting polyol ester is not usable as a refrigerator oil.

As substitutes for monochlorodifluoromethane (R-22), a conventional refrigerant for air conditioners, refrigerant mixtures comprising difluoromethane (R-32), pentafluoroethane (R-125), etc. are considered available. Promising candidates that have been named are mixed refrigerants such as R-407C (R-32/R-125/R-134a at a mixing weight ratio of 23/25/52) and R-410A (R-32/R-125 at a mixing weight ratio of 50/50). Compared with R-134a used singly, these substitute fluorocarbons generally tend to be narrow in a temperature range in which they are compatible with polyol esters. On the low-temperature side, in particular, this tendency is marked.

In Japanese Laid-Open Patent Publication No. 17789/93, esters are evaluated using R-32 and R-125 as substitutes for R-22. Esters highly compatible with R-32 or R-125 are also proposed. However, some of them have a lower kinematic viscosity than VG32, or are poor in hydrolysis resistance. These esters are not suitable for use as refrigerator oils for refrigerators with a rotary compression or air conditioners.

As discussed above, polyol esters of viscosity grade VG32 are used not only for refrigerators, but for air conditioners. Thus, they need to be compatible with novel refrigerants, such as R-407C and R-410A, in a wide temperature range. The existing polyol esters obtained from fatty acids and polyhydric alcohols can satisfy compatibility, but they fail to fulfill all the requirements for other fundamental properties such as hydrolysis resistance or pour point.

The inventor of the present invention (hereinafter referred to simply as the inventor) focused on a high viscosity grade, and found high performance polyol esters having satisfactory compatibility with substitute fluorocarbons, excellent hydrolysis resistance, high volume resistivity, and low pour point. Based on this finding, the inventor filed patent application (U.S. Ser. No. 08/608,524 by Shiokawa et al filed on Feb. 28, 1996, which was assinged to the assignee of this application).

With a conventional process for production of polyol esters, as described previously, the reaction between a fatty acid and a polyhydric alcohol proceeds very slowly even at high temperatures of 200° or above. Whereas the method carried out via an acid chloride causes the tiresome handling of an acid chloride, making a production process complicated.

As polyol esters of viscosity grade VG32, proposals have been made of some kinds of polyol esters based on combinations of fatty acids and polyhydric alcohols. However, those satisfying all of the fundamental properties required, such as compatibility with novel refrigerants including R-407C and R-410A, hydrolysis resistance, and pour point (−40° C. or lower), have not been obtained. Thus, a demand is intense for polyol esters having high performance at viscosity grade VG32 having a kinematic viscosity at 40° C. of 28 to 40 cst.

SUMMARY OF THE INVENTION

It is an object of the present invention to solve the foregoing problems with conventional polyol esters as lubricants, and provide a high performance polyol ester which is highly compatible with hydrofluorocarbons promising as substitute fluorocarbons, especially, refrigerants minimally compatible with polyol esters, such as R-407C and R-410A, and has excellent hydrolysis resistance, a pour point of −40° C. or lower, and a kinematic viscosity at 40° C. of 28 to 40 cst.

The inventor has conducted an in-depth study of lubricating polyol esters posing the aforementioned problems. This study has led to the finding that a polyol ester, which is obtained by mixing (a) a polyol ester obtained by reacting iso-octene, carbon monoxide and neopentyl glycol in the presence of hydrogen fluoride, with (b) a polyol ester obtained by reacting 1-octene, carbon monoxide and neopentyl glycol in the presence of hydrogen fluoride, at a weight ratio of 70–85%/15–30%, has a kinematic viscosity in the range of 28 to 40 cst at 40° C. (VG32), is highly compatible with substitute fluorocarbons, and has excellent hydrolysis resistance and a low pour point. Based on this finding, the inventor has accomplished the present invention.

The aforementioned patent applications filed by the inventor also give high performance polyol esters with viscosity grade VG32, but their pour points failed to reach −40° C. The present invention, on the other hand, can lower the pour point to −40° C. or lower while practically retaining the other fundamental properties, by mixing a polyol ester derived from 1-octene with a polyol ester derived from iso-octene at a certain ratio, as described above.

That is, the preset invention pertains to a polyol ester-based lubricant comprising a polyol ester (A) and a polyol ester (B);

the polyol ester (A) comprising an ester of a neopentyl polyol and an acid residue of carbon number of 6-17, in which alpha-carbon in the acid residue of the polyol ester is tertiarily branched, and when alkyl groups having 4 or more carbon atoms are bonded to the alpha-carbon, the alkyl groups are branched, and the polyol ester (B) comprising an ester of a neopentyl polyol and an acid residue of carbon number of 6-17, in which alpha-carbon in the acid residue of the polyol ester is secondarily or tertiarily branched and alkyl groups bonded to the alpha-carbon are straight.

PREFERRED EMBODIMENTS OF THE INVENTION

Preferably, the polyol ester (A) of the present invention comprises an iso-octene-derived polyol ester mixture and the polyol ester (B) of the present invention comprises a 1-octene-derived polyol ester mixture. The polyol ester (A) may be 70–85% by weight and the polyol ester (B) may be 15–30% by weight.

These polyol ester mixtures are prepared by reacting iso-octene or 1-octene, carbon monoxide and a polyhydric alcohol in hydrogen fluoride. As the polyhydric alcohol, neopentyl glycol is preferably used. A fatty acid fluoride obtained by reacting iso-octene or 1-octene with carbon monoxide in hydrogen fluoride is reacted with neopentyl polyol to obtain either the fatty acid/neopentyl polyol ester mixture (in which alpha-carbon in acid residue of the polyol ester is tertially branched), when starting from iso-octene, or the polyol ester mixture (in which alpha-carbon in the acid residue of the polyol ester is secondarily or tertiarily branched, and alkyl groups bonded to the alpha-carbon are straight), when starting from 1-octene.

The iso-octene for use in the invention may be an about 7:3 mixture of 2,4,4-trimethyl-1-pentene and 2,4,4-trimethyl-2-pentene, a commercially available article, in addition to 2,4,4-trimethyl-1-pentene or 2,4,4-trimethyl-2-pentene.

By using iso-octene as the starting material, dimerization of iso-octene and the cleavage of the alkyl groups of iso-octene take place simultaneously before the reaction of iso-octene with carbon monoxide, whereby fatty acid fluorides having different numbers of carbon atoms are obtained. Furthermore, the fatty acid residues are highly branched. Thus, esters prepared by their esterification achieve a broad temperature range ensuring compatibility with substitute fluorocarbons, especially on the low-temperature side.

Besides, the fatty acid fluorides having different numbers of carbon atoms are reacted with neopentyl glycol, thus producing a very large amount of polyol esters in which the number of carbon atoms and the degree of branching are different between the two acid residues in one molecule of the polyol ester (hybrid ester). This fact also contributes greatly to broadening the temperature range ensuring compatibility with substitute fluorocarbons.

Moreover, owing to the use of iso-octene as the starting material, almost all of the alpha-carbons of the acid residues undergo tertiary branching. Thus, the resulting polyol ester is highly resistant to hydrolysis. This iso-octene-derived polyol ester can have a further lowered pour point when subjected to purification such as hydrogenation or high boiling cut distillation. However, it is difficult to drop the pour point to −40° or lower.

In the case of the 1-octene-derived polyol ester mixture, the use of 1-octene as the starting material results in the isomerization of 1-octene itself or the dimerization of 1-octene molecules before carbon monoxide reacts with 1-octene, so that various fatty acid fluorides occur. As with iso-octene, therefore, there are more polyol esters in which the number of carbon atoms and the degree of branching are different between the two acid residues in one polyol ester molecule. As a result, the temperature range ensuring compatibility with substitute fluorocarbons widens. Since 1-octene is used as the starting material, moreover, the alpha-carbons of the acid residues are secondarily or tertiarily branched. Thus, the resulting polyol ester is highly resistant to hydrolysis.

Compared with the iso-octene-derived polyol ester, the 1-octene-derived polyol ester is low in the degree of branching of the acid residue, and thus its pour point further lowers. By mixing the 1-octene-derived polyol ester with the iso-octene-derived polyol ester, therefore, the pour point can be dropped easily.

The iso-octene-derived polyol ester, on the other hand, is high in the degree of branching of the acid residue, in comparison with the 1-octene-derived polyol ester. Thus, the iso-octene-derived polyol ester is wider in the temperature range ensuring compatibility with substitute fluorocarbons.

According to the present invention, the pour point can be lowered, with the temperature range ensuring compatibility with substitute fluorocarbons being minimally changed, by mixing the 1-octene-derived polyol ester in an amount of 15 to 30% by weight with the iso-octene-derived polyol ester.

The process for producing polyol ester of the present invention may be any of the following methods:

1) Reacting an olefin with carbon monoxide in hydrogen fluoride, followed by reacting the product with neopentyl polyol;

2) Feeding an olefin in the presence of hydrogen fluoride, carbon monoxide and neopentyl polyol to perform their reaction; and 3) Simultaneously feeding an olefin and neopentyl polyol in the presence of hydrogen fluoride and carbon monoxide to carry out the reaction.

Of these methods, the method 1) gives polyol ester in the highest yield.

For the production of the iso-octene-derived polyol ester, the amount of hydrogen fluoride used is not less than 2 mols but less than 5 mols per mol of iso-octene used. If its amount is less than 2 mols, the carbonylation rate will decrease, and the amount of side reaction will increase, causing an economic disadvantage. If the amount is 5 mols or more, the carbonylation rate will remain unchanged, and a heat load will increase for the recovery of hydrogen fluoride by distillation. This will be economically disadvantageous.

The reaction temperature for the reaction between iso-octene and carbon monoxide in the present invention is $-50°$ to $-10°$ C., preferably $-40°$ to $-20°$ C. Too low a reaction temperature would lower the reaction rate, and make the kinematic viscosity too high. Also, great energy would be required for cooling. Thus, that would be to an economic disadvantage. At the reaction temperature of higher than $-10°$ C., the kinematic viscosity would be lower than the desired kinematic viscosity.

For the production of the 1-octene-derived polyol ester, the amount of hydrogen fluoride used is not less than 5 mols, but not more than 30 mols, preferably not less than 7 mols but not more than 15 mols, per mol of 1-octene used. If its amount is less than 5 mols, the carbonylation rate will decrease, and the amount of side reaction will increase, causing an economic disadvantage. If the amount is more than 15 mols per mol of 1-octene, the carbonylation rate will remain unchanged, and the reactor is required to have a large capacity. Furthermore, a heat load will be large duration recovery of hydrogen fluoride by distillation. This will be economically disadvantageous.

The reaction temperature for the reaction between 1-octene and carbon monoxide is $-30°$ to $50°$ C., preferably $-20°$ to $40°$ C. Too low a reaction temperature would lower the reaction rate, and require great energy for cooling, thus resulting in an economic disadvantage. If the reaction temperature is $20°$ C. or higher, the kinematic viscosity would rise gradually as the amount of side reaction increases.

The reaction pressure for the reaction between the olefin and carbon monoxide in hydrogen fluoride is 10 to 100 kg/cm$^2$ G or less, preferably 10 to 80 kg/cm$^2$ G. If the reaction pressure is low, the yield of the acid fluoride as the intermediate will decrease. If the pressure is higher than 100 kg/cm$^2$ G, however, the yield will be nearly unchanged, and the facilities cost will be high, causing an economic disadvantage.

This reaction pressure is that applied when high purity carbon monoxide is used. If a considerable amount of an inert gas is contained in the carbon monoxide gas used, the reaction pressure is determined so that the partial pressure of carbon monoxide will become the reaction pressure. The amount of carbon monoxide used in the reaction is determined by the reaction pressure.

The amount of neopentyl polyol used in the esterification for production of the iso-octene-derived polyol ester is preferably 1.0 to 1.1 mole (based on the molar amount of the OH groups of neopentyl polyol) per mol of carbon monoxide absorbed in the carbonylation reaction. Too small an amount of neopentyl polyol used would cause the unreacted acid fluoride to remain. If the amount of neopentyl polyol used is too large, a monoester will form in a large amount.

For the product of the 1-octene-derived polyol ester, the amount of neopentyl polyol used in the esterification is 0.9 to 1.1 mole (based on the molar amount of the OH groups of neopentyl polyol), preferably 0.95 to 1.05 mole, per mol of carbon monoxide absorbed in the carbonylation reaction. Too small an amount of neopentyl polyol used would result in the increased recovery of the unreacted acid fluoride. If the amount of neopentyl polyol used is too large, a monoester will form in a large amount.

The reaction temperature for the esterification is $-50°$ to $10°$ C., preferably $-30°$ to $10°$ C., and the reaction is performed under pressure or at atmospheric pressure.

The esterification reaction of the present invention may be performed batchwise or continuously, but a continuous method is advantageous for commercial purposes. The conventional method, which produces ester from a fatty acid and a polyhydric alcohol while removing water formed, can basically be carried out only batchwise. When various fatty acids with different degrees of branching of the alpha-carbon are reacted with polyhydric alcohols, a difference in the reaction rate arises depending on the degree of branching of the fatty acid, so that the esterification may fail. In the light of these drawbacks, the ester production process of the present invention is advantageous.

When hydrogen fluoride is to be separated industrially from the polyol ester after esterification, there is employed a method of recovering hydrogen fluoride by distillation under reflux of a saturated hydrocarbon. Hydrogen fluoride recovered by distillation is circulated into the carbonylation reactor. Examples of the saturated hydrocarbon are hexane, heptane, octane, nonane and decane. The saturated hydrocarbon serves to supply heat for the decomposition of hydrogen fluoride and the polyol ester, and to dilute the polyol ester at the bottom of the distillation column.

After the distillation for recovery of hydrogen fluoride, the polyol ester obtained by the esterification can be subjected to purification by distillation in customary use, or to hydrolysis treatment involving the addition of water for further improved hydrolysis resistance; adsorption treatment using an adsorbent; or treatment with china clay.

High boiling cut distillation or hydrogenation, which is performed if desired, is also effective for improving the pour point, volume resistivity, and color value.

The iso-octene-derived polyol ester can have a kinematic viscosity in the range of from 60 to 80 cst at $40°$ C. by combining the above-described reaction conditions. Similarly, the 1-octene-derived polyol ester can have a kinematic viscosity in the range of from 8 to 15 cst at $40°$ C. by combining these reaction conditions.

To the polyol ester-based lubricant of the present invention, additives conventionally used for refrigerator oils, such as an antioxidant, a wear preventer, and an epoxy compound, may be added where necessary.

The polyol ester-based lubricant of the invention is preferably a composition comprising the polyol ester mixtures (A) and (B) expressed by the chemical formulae shown below.

The iso-octene-derived polyol ester mixture (A) of the general formula (I)

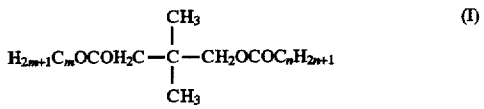

comprising (1) 52.0–58.0% by weight of a polyol ester in which $5 \leq m \leq 8$ and $5 \leq n \leq 8$, (2) 38.0–44.0% by weight of a polyol ester in which $5 \leq m \leq 8$ and $8 < n \leq 16$, and (3) 3.0–7.0% by weight of a polyol ester in which $8 < m \leq 16$ and $8 < n \leq 16$, with the proviso that m and n are each an integer.

In the iso-octene-derived polyol ester mixture, when the proportion of the polyol ester (1) increases, while the proportions of the polyol esters (2) and (3) decrease, the kinematic viscosity of the polyol esters lowers. As a result, the amount of the 1-octene-derived polyol ester added will be less than 15% by weight, so that the pour point will not be improved. When the proportion of the polyol ester (1) decreases, while the proportions of the polyol esters (2) and (3) increase, on the other hand, the kinematic viscosity of the polyol esters rises. To bring the kinematic viscosity at 40° C. to the range of from 28 to 40 cst under these conditions, the amount of the 1-octene-derived polyol ester added will be more than 30% by weight, making the temperature range ensuring compatibility with substitute fluorocarbons gradually narrow.

The 1-octene-derived polyol ester mixture (B) of the general formula (II)

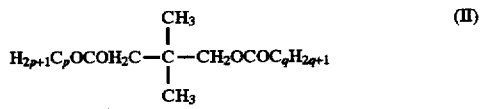

comprising (4) 93.0–97.0% by weight of a polyol ester in which $5 \leq p \leq 8$ and $5 \leq q \leq 8$, (5) 3.0–5.0% by weight of a polyol ester in which $5 \leq p \leq 8$ and $8 < q \leq 16$, and (6) 0.1–4.0% by weight of a polyol ester in which $8 < p \leq 16$ and $8 < q \leq 16$, with the proviso that p and q are each an integer.

In the 1-octene-derived polyol ester mixture, when the proportion of the polyol ester (4) increases, while the proportions of the polyol esters (5) and (6) decrease, the kinematic viscosity of the polyol esters lowers. As a result, the amount of the 1-octene-derived polyol ester added will be more than 30% by weight, so that the temperature range ensuring compatibility with substitute fluorocarbons will become gradually narrow. When the proportion of the polyol ester (4) decreases, while the proportions of the polyol esters (5) and (6) increase, on the other hand, the kinematic viscosity of the polyol esters gradually rises. To bring the kinematic viscosity at 40° C. to the range of from 28 to 40 cst under these conditions, the amount of the 1-octene-derived polyol ester added will be less than 15% by weight, with the result that the pour point will not be improved.

Thus, the proportions in the mixtures of the general formulae (I) and (II) are highly significant, and these proportions must be observed for obtaining a high performance polyol ester having a kinematic viscosity in the range of 28 to 40 cst at 40° C.

The polyol ester-based lubricant of the present invention is used as a base oil for a lubricant for substitute fluorocarbons. It is used not only for R-134a, the commonest substitute fluorocarbon, but for R-407C and R-410A which are minimally compatible with polyol ester. Thus, the phase separation temperature of the mixture of the polyol ester with the substitute fluorocarbon, the hydrolysis resistance by a sealed tube test, and the pour point are defined in the present invention.

The pour point is measured by the method of JIS K-2269, which shows the pour point of the polyol ester-based lubricant of the present invention to be –40° C. or lower.

The sealed tube test is conducted as follows: A test tube of glass is charged with a refrigerant (substitute fluorocarbon), a polyol ester sample adjusted to a water content of 1,000 ppm or less and an acid value of 0.01 mgKOH/g or less, and iron, copper and aluminum as catalysts. The tube is tightly closed, and heated at 200° C. for 28 days. Then, the polyol ester is measured for an acid value. When 1,1,1,2-tetrafluoroethane (R-134a) is used as the refrigerant, the polyol ester-based lubricant of the invention exhibits an acid value of 0.02 mgKOH/g or less.

The phase separation temperature refers to a temperature at which a mixture prepared by mixing a refrigerant (substitute fluorocarbon) with the polyol ester in a refrigerant/polyol ester weight ratio of 9/1 and dissolving the mixture at room temperature is phase-separated into the refrigerant and the polyol ester when gradually cooled or heated. The polyol ester-based lubricant usually has the phase separation temperature on the low-temperature side and the high-temperature side.

(a) When 1,1,1,2-tetrafluoroethane (R-134a) as the refrigerant and the polyol ester-based lubricant of the present invention are mixed in an R-134a/polyol ester-based lubricant weight ratio of 9/1, the phase separation temperature of the mixture is –60° C. or lower on the low-temperature side, and 100° C. or higher on the high-temperature side. (b) When a fluorocarbon mixture of difluoromethane, pentafluoroethane and 1,1,1,2-tetrafluoroethane mixed in a weight ratio of 23/25/52 (R-407C) is used as a refrigerant, and this refrigerant is mixed with the polyol ester-based lubricant of the invention in an R-407C/polyol ester-based lubricant weight ratio of 9/1, the phase separation temperature of the mixture is –45° C. or lower on the low-temperature side, and 80° C. or higher on the high-temperature side. (c) When a mixture of difluoromethane and pentafluoroethane mixed in a weight ratio of 50/50 (R-410A) is used as a refrigerant, and this refrigerant is mixed with the polyol ester-based lubricant of the invention in an R-410A/polyol ester-based lubricant weight ratio of 9/1, the phase separation temperature of the mixture is –30° C. or lower on the low-temperature side, and 60° C. or higher on the high-temperature side.

EXAMPLES

The present invention will be described in greater detail by reference to Examples, which do not limit the invention.

The esters obtained in the Examples and Comparative Examples were tested for hydrolysis resistance and compatibility with fluorocarbons in the manners described below. The pour points were measured by JISK-2269.

Hydrolysis resistance test

A test tube of glass was charged with iron wire, copper wire and aluminum wire having a length of 8 cm each as catalysts, 10 g of an ester sample adjusted to a water content of 1,000 ppm, and 2 g of a refrigerant (R-134a), and then tightly closed. The sealed test tube was heated at 200° C. for 28 days, whereafter the ester was measured for an acid value.

Compatibility test

A test tube of glass was charged with 0.2 of an ester sample and 1.8 g of each refrigerant (R-134a, R-407C, R-410A), and then sealed. The mixture was cooled or heated at a rate of 1° C./minute, starting at 20° C., to measure the phase separation temperature on the low-temperature side and the high-temperature side.

Example 1

An iso-octene-derived ester was produced using a stainless steel autoclave having a stirrer, three inlet nozzles in a top portion, and one outlet nozzle at bottom, and having a jacket for adjusting its internal temperature.

After the inside of the autoclave was purged with carbon monoxide, 100 mols (2,000 g) of hydrogen fluoride was introduced, cooled to −30° C., and pressurized up to 20 kg/cm$^2$ with carbon monoxide.

While carbon monoxide was being fed so as to maintain the reaction temperature at −30° C. and the reaction pressure at 20 kg/cm$^2$, 31.3 mols (3,506 g) of an iso-octene mixture (an approximately 7/3 mixture of 2,4,4-trimethyl-1-pentene and 2,4,4-trimethyl-2-pentene) was fed through the gaseous phase of the autoclave to synthesize an acid fluoride mixture. After the supply of the iso-octene mixture was completed, the mixture was continuously stirred for about 20 minutes until no absorption of carbon monoxide was observed. The amount of carbon monoxide absorbed was 28.8 mols.

The temperature of the autoclave was adjusted to −10° C., and the pressure was decreased to atmospheric pressure. Then, neopentyl glycol in an equimolar amount to carbon monoxide adsorbed in the reaction (based on the molar amount of OH groups of the neopentyl glycol) was supplied to the autoclave, and the mixture was reacted for 2 hours.

The reaction mixture was supplied into a distillation column for recovery of hydrogen fluoride, and hydrogen fluoride was recovered from the column top, while a crude polyol ester was recovered from the column bottom. The crude ester recovered from the column bottom was rectified in a rectification column. Then, 5% by weight of water based on the resulting ester was added, followed by stirring the mixture at 200° C. for 3 hours to perform hydrolysis treatment. After treatment with an adsorbent, the treated product was hydrogenated with 5% Ru/C, and dehydrated by nitrogen bubbling to obtain a purified polyol ester.

The resulting polyol ester had an acid value of 0.01 mgKOH/g and a water content of 90 ppm. Its kinematic viscosity at 40° C. measured with a Ubbellohde viscometer was 80 cst.

Then, a 1-octene-derived ester was produced using the autoclave used in the production of the iso-octene-derived ester. After the inside of the autoclave was purged with carbon monoxide, 100 mols (2,000 g) of hydrogen fluoride was introduced, cooled to −15° C., and pressurized up to 20 kg/cm$^2$ with carbon monoxide.

While carbon monoxide was being fed so as to maintain the reaction temperature at −15° C. and the reaction pressure at 20 kg/cm$^2$, 8.3 mols (933 g) of 1-octene was fed through the gaseous phase of the autoclave to synthesize an acid fluoride mixture. After the supply of 1-octene was completed, the mixture was continuously stirred for about 20 minutes until no absorption of carbon monoxide was observed. The amount of carbon monoxide absorbed was 6.5 mols.

The temperature inside the autoclave was adjusted to −10° C., and the pressure was decreased to atmospheric pressure. Then, neopentyl glycol in an equimolar amount to carbon monoxide adsorbed in the reaction (based on the molar amount of OH groups of the neopentyl glycol) was supplied to the autoclave, and the mixture was reacted for 2 hours.

The reaction mixture was supplied into a distillation column for recovery of hydrogen fluoride, and hydrogen fluoride was recovered from the column top, while a crude polyol ester was recovered from the column bottom. The crude ester recovered from the column bottom was placed in a rectification column, where low boiling components were cut. Then, 5% by weight of water based on the resulting ester was added, followed by stirring the mixture at 200° C. for 3 hours to perform hydrolysis treatment. After treatment with an adsorbent, the treated produce was hydrogenated with 5% Ru/C, and dehydrated by nitrogen bubbling to obtain a purified polyol ester.

The resulting polyol ester had an acid value of 0.01 mgKOH/g and a water content of 90 ppm. Its kinematic viscosity at 40° C. measured with a Ubbellohde viscometer was 11 cst.

The compositions of the iso-octene-derived polyol ester and the 1-octene-derived polyol ester were as follows:

Iso-octene-derived polyol ester
(1) Polyol ester with $5 \leq m \leq 8$ and $5 \leq n \leq 8$ 52.3% by weight
(2) Polyol ester with $5 \leq m \leq 8$ and $8 < n \leq 16$ 41.4% by weight
(3) Polyol ester with $8 < m \leq 16$ and $8 < n \leq 16$ 6.3% by weight 1-octene-derived polyol ester
(4) Polyol ester with $5 \leq p \leq 8$ and $5 \leq q \leq 8$ 95.2% by weight
(5) Polyol ester with $5 \leq p \leq 8$ and $8 < q \leq 16$ 4.0% by weight
(6) Polyol ester with $8 < p \leq 16$ and $8 < q \leq 16$ 0.8% by weight When this iso-octene-derived polyol ester and this 1-octene-derived polyol ester were mixed in a weight ratio of 70/30, a polyol ester having a kinematic viscosity at 40° C. of 33 cst was obtained.

Example 2

An iso-octene-derived polyol ester and a 1-octene-derived polyol ester were synthesized in the same manner as in Example 1, except that the amount of iso-octene supplied was 29.4 mols and the carbonylation temperature for 1-octene was −10° C.

The resulting polyol esters each had an acid value of 0.01 mgKOH/g and a water content of 90 ppm. Their kinematic viscosities at 40° C. measured with a Ubbellohde viscometer were 74 cst and 12 cst, respectively.

The compositions of the iso-octene-derived polyol ester and the 1-octene-derived polyol ester were as follows:

Iso-octene-derived polyol ester
(1) Polyol ester with $5 \leq m \leq 8$ and $5 \leq n \leq 8$ 54.2% by weight
(2) Polyol ester with $5 \leq m \leq 8$ and $8 < n \leq 16$ 40.6% by weight
(3) Polyol ester with $8 < m \leq 16$ and $8 < n \leq 16$ 5.2% by weight 1-octene-derived polyol ester
(4) Polyol ester with $5 \leq p \leq 8$ and $5 \leq q \leq 8$ 94.5% by weight
(5) Polyol ester with $5 \leq p \leq 8$ and $8 < q \leq 16$ 4.3% by weight
(6) Polyol ester with $8 < p \leq 16$ and $8 < q \leq 16$ 1.2% by weight When the iso-octene-derived polyol ester and the 1-octene-derived polyol ester were mixed in a weight ratio of 85/15, a polyol ester having a kinematic viscosity at 40° C. of 40 cst was obtained.

Example 3

An iso-octene-derived polyol ester and a 1-octene-derived polyol ester were synthesized in the same manner as in Example 1, except that the amount of iso-octene supplied was 26.3 mols.

The resulting polyol esters each had an acid value of 0.01 mgKOH/g and a water content of 90 ppm. Their kinematic viscosities at 40° C. measured with a Ubbellohde viscometer were 65 cst and 11 cst, respectively.

The compositions of the iso-octene-derived polyol ester and the 1-octene-derived polyol ester were as follows:

Iso-octene-derived polyol ester
(1) Polyol ester with 5≦m≦8 and 5≦n≦8 56.8% by weight
(2) Polyol ester with 5≦m≦8 and 8<n≦16 39.4% by weight
(3) Polyol ester with 8<m≦16 and 8<n≦16 3.8% by weight 1-octene-derived polyol ester
(4) Polyol ester with 5≦p≦8 and 5≦q≦8 95.2% by weight
(5) Polyol ester with 5≦p≦8 and 8<q≦16 4.0% by weight
(6) Polyol ester with 8<p≦16 and 8<q≦16 0.8% by weight When the iso-octene-derived polyol ester and the 1-octene-derived polyol ester were mixed in a weight ratio of 85/15, a polyol ester having a kinematic viscosity at 40° C. of 31 cst was obtained.

Example 4

An iso-octene-derived polyol ester and a 1-octene-derived polyol ester were synthesized in the same manner as in Example 2, except that the amount of iso-octene supplied was 25.0 mols.

The resulting polyol esters each had an acid value of 0.01 mgKOH/g and a water content of 90 ppm. Their kinematic viscosities at 40° C. measured with a Ubbellohde viscometer were 56 cst and 12 cst, respectively.

The compositions of the iso-octene-derived polyol ester and the 1-octene-derived polyol ester were as follows:

Iso-octene-derived polyol ester
(1) Polyol ester with 5≦m≦8 and 5≦n≦8 60.5% by weight
(2) Polyol ester with 5≦m≦8 and 8<n≦16 36.9% by weight
(3) Polyol ester with 8<m≦16 and 8<n≦16 2.6% by weight 1-octene-derived polyol ester
(4) Polyol ester with 5≦p≦8 and 5≦q≦8 94.5% by weight
(5) Polyol ester with 5≦p≦8 and 8<q≦16 4.3% by weight
(6) Polyol ester with 8<p≦16 and 8<q≦16 1.2% by weight When the iso-octene-derived polyol ester and the 1-octene-derived polyol ester were mixed in a weight ratio of 95/5, a polyol ester having a kinematic viscosity at 40° C. of 31 cst was obtained.

Example 5

An iso-octene-derived polyol ester and a 1-octene-derived polyol ester were synthesized in the same manner as in Example 1, except that the amount of iso-octene supplied was 38.5 mols.

The resulting polyol esters each had an acid value of 0.01 mgKOH/g and a water content of 90 ppm. Their kinematic viscosities at 40° C. measured with a Ubbellohde viscometer were 100 cst and 11 cst, respectively.

The compositions of the iso-octene-derived polyol ester and the 1-octene-derived polyol ester were as follows:

Iso-octene-derived polyol ester
(1) Polyol ester with 5≦m≦8 and 5≦n≦8 47.2% by weight
(2) Polyol ester with 5≦m≦8 and 8<n≦16 44.3% by weight
(3) Polyol ester with 8<m≦16 and 8<n≦16 8.5% by weight 1-octene-derived polyol ester
(4) Polyol ester with 5≦p≦8 and 5≦q≦8 95.2% by weight
(5) Polyol ester with 5≦p≦8 and 8<q≦16 4.0% by weight
(6) Polyol ester with 8<p≦16 and 8<q≦16 0.8% by weight When the iso-octene-derived polyol ester and the 1-octene-derived polyol ester were mixed in a weight ratio of 62/38, a polyol ester having a kinematic viscosity at 40° C. of 31 cst was obtained.

Comparative Example 1

An iso-octene-derived polyol ester was synthesized in the same manner as in Example 1, except that the amount of iso-octene supplied was 25.0 mols and the carbonylation temperature was 0° C.

The resulting polyol ester had an acid value of 0.01 mgKOH/g and a water content of 90 ppm. Its kinematic viscosity at 40° C. measured with a Ubbellohde viscometer was 32 cst.

The composition of the resulting polyol ester was as follows:
(1) Polyol ester with 5≦m≦8 and 5≦n≦8 62.3% by weight
(2) Polyol ester with 5≦m≦8 and 8<n≦16 23.6% by weight
(3) Polyol ester with 8<m≦16 and 8<n≦16 1.1% by weight Polyol esters other than (1), (2) and (3) 13.0% by weight Comparative Example 2

A stirrer, a thermometer, a nitrogen-introducing tube, and a dehydrating tube with a condenser were attached to a 1-liter four-necked flask. This flask was charged with 1.2 mols (161 g) of trimethylolpropane and 3.6 mol (475 g) of 3,5-dimethylhexanoic acid. The system was esterified in a stream of nitrogen for 10 hours at 240° C. to yield a triester. The resulting triester was dehydrated by nitrogen bubbling.

The resulting polyol ester had an acid value of 0.01 mgKOH/g and a water content of 90 ppm. Its kinematic viscosity at 40° C. measured with a Ubbellohde viscometer was 30 cst.

Comparative Example 3

The same flask as in Comparative Example 1 was charged with 2-methylhexanoic acid and 2-ethylhexanoic acid in a weight ratio of 60/40. Likewise, pentaerythritol was charged into the flask in an equimolar amount to the total number of mols of the 2-methylhexanoic acid and 2-ethylhexanoic acid (based on the molar amount of OH groups of the pentaerythritol). Then, the system was esterified in the same manner as in Comparative Example 1. The resulting tetraester was dehydrated by nitrogen bubbling.

The resulting polyol ester had an acid value of 0.01 mgKOH/g and a water content of 90 ppm. The kinematic viscosity at 40° C. of the resulting tetraester measured with a Ubbellohde viscometer was 33 cst.

Comparative Example 4

The same flask as in Comparative Example 1 was charged with 2-methylhexanoic acid and 3,5-dimethylhexanoic acid in a weight ratio of 80/20. Likewise, pentaerythritol was charged into the flask in an equimolar amount to the total number of mols of the 2-methylhexanoic acid and 3,5-dimethylhexanoic acid (based on the molar amount of OH groups of the pentaerythritol). Then, the system was esterified in the same manner as in Comparative Example 1. The resulting tetraester was dehydrated by nitrogen bubbling.

The resulting polyol ester had an acid value of 0.01 mgKOH/g and a water content of 90 ppm. The kinematic viscosity at 40° C. of the resulting tetraester measured with a Ubbellohde viscometer was 30 cst.

Table 1 shows the results of the hydrolysis resistance test of the esters obtained in the Examples and Comparative Examples, along with the pour points and the kinematic viscosities. Table 2 shows the results of the test of the compatibility with R-134a, R-407C and R-410A.

In Comparative Examples 1, 2 and 3, the phase separation temperature of the mixture with R-134a on the low-temperature side did not reach −60° C. or lower. Thus, the test of the compatibility with the refrigerant R-407C or R-410A, which is poorer in compatibility than R-134a, was not conducted.

TABLE 1

|  | Acid hydrolysis (Acid value, mgKOH) | | Pour Point | Kinematic viscosity |
|---|---|---|---|---|
|  | Before test | After test | (°C.) | (40° C.) |
| Ex. 1 | 0.01 | 0.01 | −42.5 | 33 |
| Ex. 2 | 0.01 | 0.01 | −40.0 | 40 |

TABLE 1-continued

| | Acid hydrolysis (Acid value, mgKOH) | | Pour Point (°C.) | Kinematic viscosity (40° C.) |
|---|---|---|---|---|
| | Before test | After test | | |
| Ex. 3 | 0.01 | 0.01 | −40.0 | 31 |
| Ex. 4 | 0.01 | 0.01 | −35.0 | 31 |
| Ex. 5 | 0.01 | 0.05 | −42.5 | 31 |
| Comp. Ex. 1 | 0.01 | 0.01 | −32.5 | 32 |
| Comp. Ex. 2 | 0.01 | 2.82 | −55.0> | 30 |
| Comp. Ex. 3 | 0.01 | 0.93 | −55.0> | 33 |
| Comp. Ex. 4 | 0.01 | 2.93 | −55.0> | 30 |

TABLE 2

| Phase separation temperature (°C.) | Compatibility with | | | | | |
|---|---|---|---|---|---|---|
| | R-134a | | R-407C | | R-410A | |
| | L-T | H-T | L-T | H-T | L-T | H-T |
| Ex. 1 | −60> | 100< | −50 | 80< | −38 | 60< |
| Ex. 2 | −60> | 100< | −54 | 80< | −42 | 60< |
| Ex. 3 | −60> | 100< | −52 | 80< | −40 | 60< |
| Ex. 4 | −60> | 100< | −58 | 80< | −47 | 60< |
| Ex. 5 | −60> | 100< | −38 | 80< | −26 | 60< |
| Comp. Ex. 1 | −60> | 100< | −60> | 80< | −50< | 60< |
| Comp. Ex. 2 | −40 | 100< | N.M. | N.M. | N.M. | N.M. |
| Comp. Ex. 3 | −40 | 100< | N.M. | N.M. | N.M. | N.M. |
| Comp. Ex. 4 | −48 | 100< | N.M. | N.M. | N.M. | N.M. |

L-T: Low-temperature side
H-T: High-temperature side
N.M.: Not measured.

As the above results demonstrate, the polyol ester-based lubricant of the present invention, comprises a mixture of an iso-octene-derived polyol ester and a 1-octene-derived polyol ester, each ester being synthesized in the presence of hydrogen fluoride, and which has a kinematic viscosity in the range of 28 to 40 cst at 40° C., is highly compatible in a wide temperature range with the novel substitute fluorocarbons R-407C and R-410A, the fluorocarbons having minimum compatibility with conventional polyol esters. The inventive lubricant also has excellent hydrolysis resistance, and has a low pour point. Thus, it is a high performance lubricant.

Among conventional polyol esters obtained from fatty acids and polyhydric alcohols, there have been found no high performance polyol esters which can be used for such novel substitute fluorocarbons in the kinematic viscosity range of 28 to 40 cst at 40° C. The polyol ester-based lubricant of the present invention, by contrast, has excellent performance as a lubricant for refrigerator oils, and thus proves to be of a great commercial significance.

What is claimed is:

1. A polyol ester-based lubricant comprising a polyol ester (A) and a polyol ester (B);
   the polyol ester (A) comprising an ester of a neopentyl polyol and an acid residue of carbon number of 6–17, in which alpha-carbon in the acid residue of the polyol ester is tertiarily branched, and when alkyl groups having 4 or more carbon atoms are bonded to the alpha-carbon, the alkyl groups are branched, and
   the polyol ester (B) comprising an ester of a neopentyl polyol and an acid residue of carbon number of 6–17, in which alpha-carbon in the acid residue of the polyol ester is secondarily or tertiarily branched and alkyl groups bonded to the alpha-carbon are straight.

2. A polyol ester-based lubricant as claimed in claim 1, wherein lubricant comprises 70–85% by whight of the polyol ester (A) and 15–30% by weight of the polyol ester (B).

3. A polyol ester-based lubricant as claimed in claim 2, wherein the polyol ester (A) is the iso-octene-derived polyol ester mixture (A) expressed by the general formula (I)

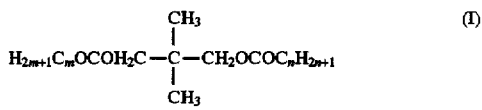

and comprises (1) 52.0–58.0% by weight of the polyol ester in which $5 \leq m \leq 8$ and $5 \leq n \leq 8$, (2) 38.0–44.0% by weight of the polyol ester in which $5 \leq m \leq 8$ and $8 < n \leq 16$, and (3) 3.0–7.0% by weight of the polyol ester in which $8 < m \leq 16$ and $8 < n \leq 16$, with the proviso that m and n are each an integer, and the polyol ester (B) is the 1-octene-derived polyol ester mixture (B) expressed by the general formula (II)

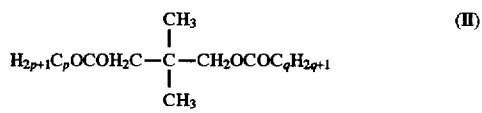

and comprises (4) 93.0–97.0% by weight of the polyol ester in which $5 \leq p \leq 8$ and $5 \leq q \leq 8$, (5) 3.0–5.0% by weight of the polyol ester in which $5 \leq p \leq 8$ and $8 < q \leq 16$, and (6) 0.1–4.0% by weight of the polyol ester in which $8 < p \leq 16$ and $8 < q \leq 16$, with the proviso that p and q are each an integer.

4. A polyol ester-based lubricant as claimed in claim 2, having a pour point of −40° C. or lower.

5. A polyol ester-based lubricant as claimed in claim 2, having an acid value of 0.02 mgKOH/g or less measured after a sample of polyol ester adjusted to a water content of 1,000 ppm or less and an acid value of 0.01 mgKOH/g or less is sealed up in a test tube together with 1,1,1,2-tetrafluoroethane, and iron, copper and aluminum as catalysts, and the mixture is heated at 200° C. for 28 days.

6. A polyol ester-based lubricant as claimed in claim 1, wherein the phase separation temperature of the mixture is −60° C. or lower on the low-temperature side, and 100° C. or higher on the higher temperature side, when the polyol ester-based lubricant and 1,1,1,2-tetrafluoroethane are mixed in a weight ratio of 9/1.

7. A polyol ester-based lubricant as claimed in claim 2, wherein the phase separation temperature of the mixture is −45° C. or lower on the low-temperature side, 80° C. or higher on the higher temperature side, when the polyol ester-based lubricant and a fluorocarbon mixture of difluoromethane, pentafluoroethane and 1,1,1,2-tetrafluoroethane in a weight ratio of 25/32/52 are mixed in a weight ratio of 9/1.

8. A polyol ester-based lubricant as claimed in claim 1, wherein the phase separation temperature of the mixture is −30° C. or lower on the low-temperature side, and 60° C. or higher on the higher temperature side, when the polyol ester-based lubricant and a fluorocarbon mixture of difluoromethane and pentafluoroethane in a weight ratio of 50/50 are mixed in a weight ratio of 9/1.

9. A refrigation working fluid comprising
(a) a fluorocarbon mixture of difluoromethane pentaflouromethane, and 1,1,1,2-tetrafluoroethane and
(b) a polyol ester-based lubricant as claimed in claim 1.

10. A refrigation working fluid as claimed in claim 9, wherein the wight ratio of difluoromethane/pentaflouromethane/1,1,1,2-tetrafluoroethane is 23/25/52/.

11. A refrigation working fluid comprising
    (a) a fluorocarbon mixture of difluoromethane and pentafluoroethane and
    (b) a polyol ester-based lubricant as claimed in claim 1.

12. A refrigation working fluid as claimed in claim 9, wherein the weight ratio of difluoromethane/pentafluoroethane is 50/50.

* * * * *

UNITED STATES PATENT AND TRADEMARK OFFICE
CERTIFICATE OF CORRECTION

PATENT NO. : 5,716,916
DATED : February 10, 1998
INVENTOR(S) : Yoshihiro SHIOKAWA et al.

It is certified that error appears in the above-indentified patent and that said Letters Patent is hereby corrected as shown below:

In column 14, line 66, delete "pentaflouromethane", and insert — pentafluoromethane —.

In column 15, line 3, delete "pentaflouromethane", and insert — pentafluoromethane —.

Signed and Sealed this

Eighth Day of February, 2000

Attest:

Q. TODD DICKINSON

Attesting Officer  Commissioner of Patents and Trademarks